(12) United States Patent
Anderson

(10) Patent No.: US 8,001,392 B2
(45) Date of Patent: Aug. 16, 2011

(54) BATTERY LOAD ALLOCATION IN PARALLEL-CONNECTED UNINTERRUPTIBLE POWER SUPPLY SYSTEMS

(75) Inventor: Jason Scott Anderson, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 685 days.

(21) Appl. No.: 11/956,531

(22) Filed: Dec. 14, 2007

(65) Prior Publication Data

US 2009/0158056 A1 Jun. 18, 2009

(51) Int. Cl.
*G05D 11/00* (2006.01)

(52) U.S. Cl. ............ 713/300; 700/79; 700/82; 700/286; 700/295

(58) Field of Classification Search .................. 713/300; 700/79, 82, 286, 295
See application file for complete search history.

(56) References Cited

U.S. PATENT DOCUMENTS

| | | | |
|---|---|---|---|
| 6,362,540 B1 * | 3/2002 | Hill | 307/52 |
| 6,411,910 B1 * | 6/2002 | Eulau et al. | 702/60 |
| 7,652,393 B2 * | 1/2010 | Moth | 307/64 |
| 7,668,624 B2 * | 2/2010 | Heber et al. | 700/286 |
| 2006/0293798 A1 * | 12/2006 | Luo et al. | 700/286 |
| 2007/0007825 A1 * | 1/2007 | Heber et al. | 307/67 |
| 2010/0082173 A1 * | 4/2010 | Heber et al. | 700/292 |

* cited by examiner

*Primary Examiner* — Abdelmoniem Elamin
(74) *Attorney, Agent, or Firm* — Myers Bigel Sibley & Sajovec, P.A.

(57) ABSTRACT

An uninterruptible power supply (UPS) of a UPS system including a plurality of UPSs connected in parallel at a load bus and configured to provide power thereto from respective batteries of a plurality of batteries is operated such that a difference between a variable, for example, battery voltage, indicative of battery capacity for a battery associated with the subject UPS and an average value of the variable for the plurality of batteries is determined and a power flow between the subject UPS and the load bus is controlled responsive to the determined difference. Controlling a power flow between the subject UPS and the load bus responsive to the determined difference may include, for example, controlling a phase of an inverter of the subject UPS responsive to the determined difference.

15 Claims, 4 Drawing Sheets

BATTERY LOAD ALLOCATION IN PARALLEL-CONNECTED UNINTERRUPTIBLE POWER SUPPLY SYSTEMS

BACKGROUND OF THE INVENTION

The invention relates to power supply systems, methods and computer program products for operation thereof and, more particularly, to uninterruptible power supply (UPS) systems, methods and computer program products for operation thereof.

UPSs may be coupled in parallel to a load to provide increased capacity and/or redundancy. For example, as illustrated in FIG. 1, a load 30 may be served by multiple UPSs 10 that are connected in common to the load 30, and which are configured to provide power to the load 30 from a primary source (e.g., a utility source) or, in the case of failure of the primary power source, from respective batteries 20. The UPSs 10 may communicate with one another via a communications bus 40 to allow interchange of control, status and other information.

In some parallel UPS systems, when operating on batteries, the runtime available to power the load may be constrained by the capacity of the weakest battery. For example, in the system illustrated in FIG. 1, when one of the UPSs 10 determines that its associated battery 20 has less than a predetermined capacity (e.g., has an undesirably low battery voltage), it may shut off, which may, in turn, cause the remaining UPSs 10 to shut down due to overload.

SUMMARY OF THE INVENTION

Some embodiments of the present invention provide methods of operating a subject uninterruptible power supply (UPS) of a UPS system including a plurality of UPSs connected in parallel at a load bus and configured to provide power thereto from respective batteries of a plurality of batteries. A difference between a variable indicative of battery capacity for a battery associated with the subject UPS and an average value of the variable for the plurality of batteries is determined. A power flow between the subject UPS and the load bus is determined responsive to the determined difference. Determining a difference between a variable indicative of battery capacity for a battery associated with the subject UPS and an average value of the variable for the plurality of batteries may include determining a difference between a battery voltage of the battery associated with the subject UPS and an average battery voltage of the plurality of batteries, and controlling a power flow between the subject UPS and the load bus responsive to the determined difference may include controlling the power flow between the subject UPS and the load bus responsive to the determined difference between the battery voltage of the battery associated with the subject UPS and the average battery voltage of the plurality of batteries. Controlling a power flow between the subject UPS and the load bus responsive to the determined difference may include, for example, controlling a phase of an inverter of the subject UPS responsive to the determined difference.

Controlling a phase of an inverter of the subject UPS responsive to the determined difference may include controlling the phase linearly with respect to the determined difference. The methods may further include limiting adjustment of the phase of the inverter of the subject UPS responsive to the determined difference falling outside of a predetermined range. In further embodiments, the methods may include determining respective power flows of the respective UPSs and limiting adjustment of the power flow between the subject UPS and the load bus responsive to the respective power flows meeting a predetermined criterion. In additional embodiments, methods may include generating a status indicator for the battery associated with the subject UPS responsive to the determined difference meeting a predetermined criterion. According to still further embodiments, determining a difference between a variable indicative of battery capacity for a battery associated with the subject UPS and an average value of the variable for the plurality of batteries may include receiving values of the variable indicative of battery capacity of other UPSs of the plurality of UPSs at the subject UPS over a communications network coupling the plurality of UPSs determining the average value of the variable from the received values.

Additional embodiments of the present invention provide a UPS including an inverter configured to transfer power between a battery and a load bus coupled to an output of the UPS and a controller operatively coupled to the inverter and configured to determine a difference between a variable indicative of battery capacity for the battery and an average value of the variable for batteries associated with a plurality of UPSs coupled in parallel at the load bus and to adjust a power flow between the inverter and the load bus responsive to the determined difference. The controller may be configured to determine a difference between a battery voltage of the battery and an average battery voltage of the plurality of batteries and to adjust a power flow between the inverter and the load bus responsive to the determined difference between the battery voltage of the battery and the average battery voltage. The controller may be configured to adjust a phase of the inverter responsive to the determined difference.

Additional embodiments of the present invention provide computer program products for operating subject UPS of a system including a plurality of UPSs connected in parallel at a load bus and configured to provide power thereto from respective batteries of a plurality of batteries. The computer program products include program code embodied in a computer-readable storage medium, the computer program code including program code configured to determine a difference between a variable indicative of battery capacity for a battery associated with the subject UPS and an average value of the variable for the plurality of batteries and to adjust a power flow between the subject UPS and the load bus responsive to the determined difference.

DETAILED DESCRIPTION OF EXEMPLARY EMBODIMENTS

Figure 1:
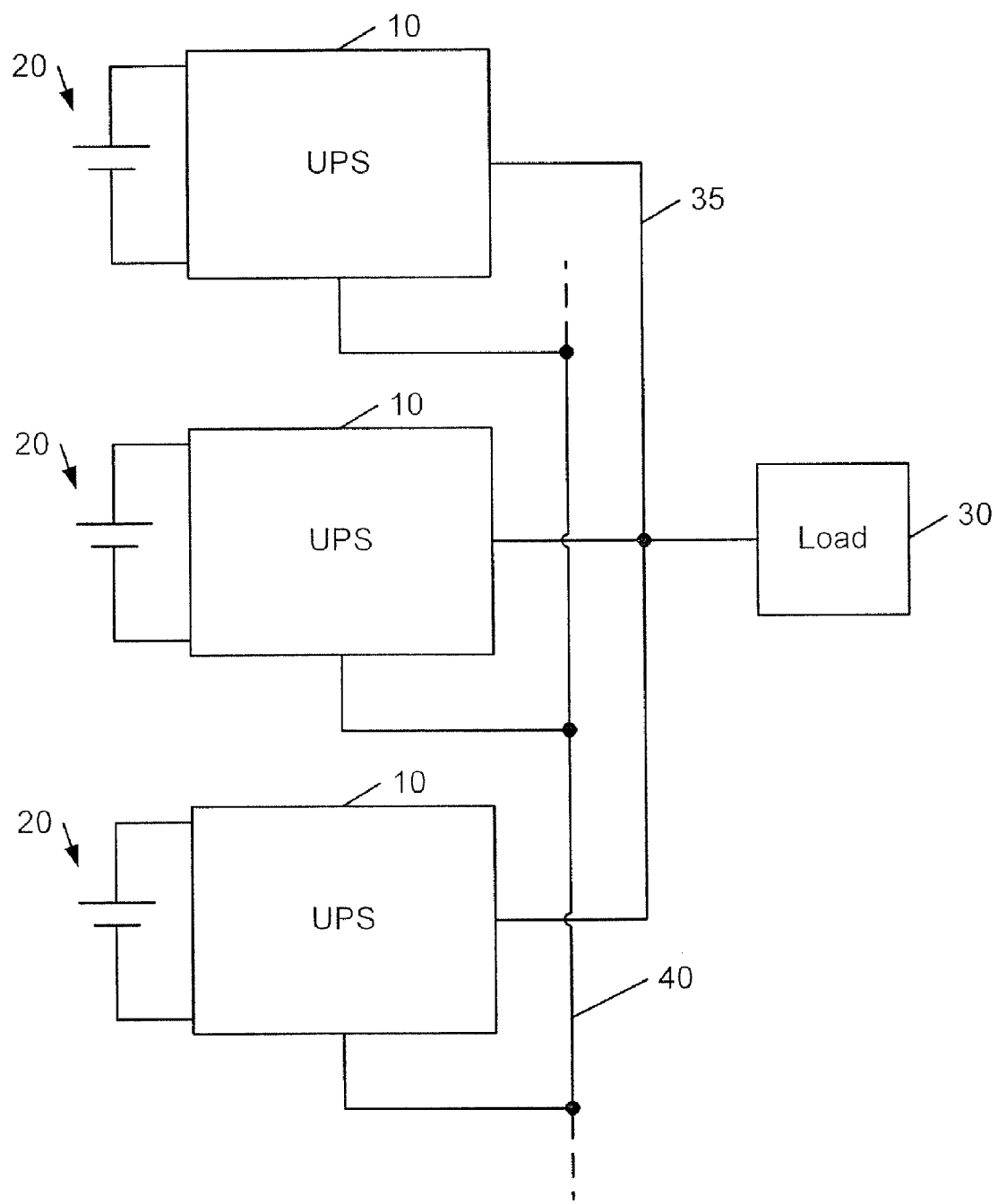
FIG. 1 is a schematic diagram illustrating a conventional UPS system including parallel-connected UPSs.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the invention may be embodied as systems, methods and computer program products. Some embodiments of the invention may include hardware and/or software. Some embodiments of the invention include circuitry configured to provide functions described herein. It will be appreciated that such circuitry may include analog circuits, digital circuits, and combinations of analog and digital circuits. Some embodiments of the invention may include computer program products comprising computer program code embodied in a computer readable storage medium, such as a semiconductor memory device (e.g., static, dynamic or flash memory) or a magnetic or optical storage medium (e.g., tape, compact disk, etc.).

Embodiments of the invention are described below with reference to block diagrams and/or operational illustrations of systems and methods according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Figure 2:
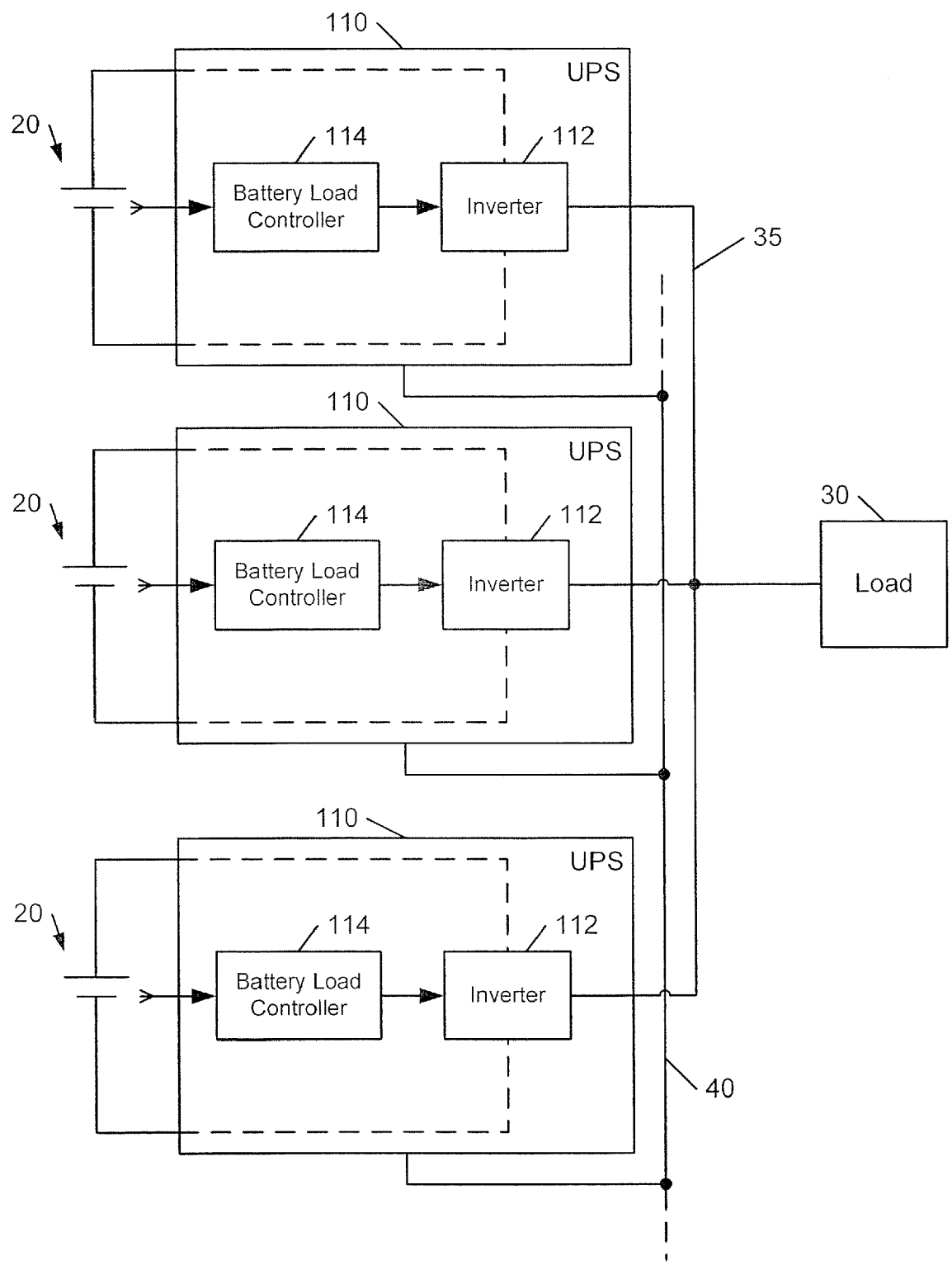
FIG. 2 is a schematic diagram illustrating a UPS system and operations thereof according to some embodiments of the present invention.

FIG. 2 illustrates a UPS system and operations thereof according to some embodiments of the present invention. The system includes a plurality of UPSs 110 connected in parallel to a load bus 35 that serves a load 30. The UPSs 110 are configured to provide power to the load bus 35 from respective batteries 20. In the illustrated embodiments, each UPS 110 includes an inverter 112 that generates AC power on the load bus 35 from DC power supplied by the associated battery 20. Each UPS 110 further includes a battery load controller 114 that is configured to control power transfer from the battery 20 to the load bus 35 by the inverter 35 responsive to battery information received from the other UPSs 110 via a communications bus 40.

It will be appreciated that, in general, the battery load controller 114 may be implemented using analog circuitry and/or digital circuitry, including such devices as microcontrollers, microprocessors or special purpose devices (e.g., ASICs). For example, the battery load controller 114 may be implemented using software and/or firmware executing on a microprocessor, microcontroller or other computing device that is configured to control other operations of the UPS 110, including, for example, operations of the inverter 112 and/or other power conversion circuitry of the UPS 110.

Figure 3:
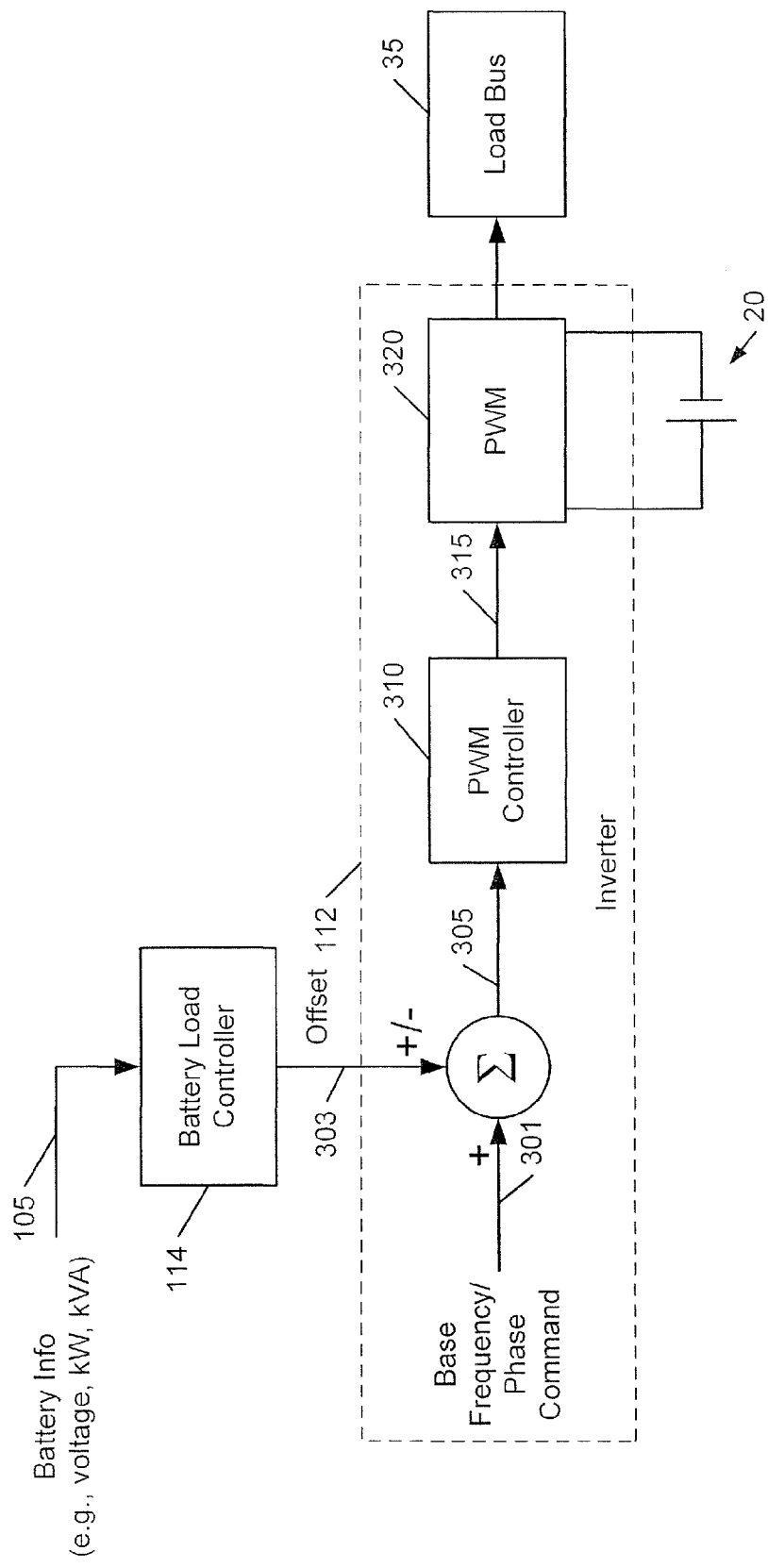
FIG. 3 is a schematic diagram illustrating UPS inverter control apparatus and operations thereof according to further embodiments of the present invention.

In some embodiments of the present invention, a battery load controller may be configured to control a phase of an inverter of a UPS. For example, as shown in FIG. 3, an inverter 112 of a UPS may include a pulse width modulation (PWM) controller 310 that generates a control signal 315 (e.g., a transistor drive signal) for a PWM circuit 320 (e.g., a bridge circuit) connected to a load bus 35. As illustrated, the PWM controller 310 may be configured to generate the control signal 315 responsive to a frequency/phase command 305, which may include an offset signal 303 generated by the battery load controller 114 based on battery information 105 (e.g., battery voltage, load kW and/or kVA information) received from other parallel-connected UPSs. The offset signal 303, which is combined with a base frequency/phase command 301, may be used to increase or decrease the phase of the PWM circuit 320 such that power delivered from the associated battery 20 to the load bus 35 by the inverter 112 may be increased or decreased responsive to the received battery information 111.

Figure 4:
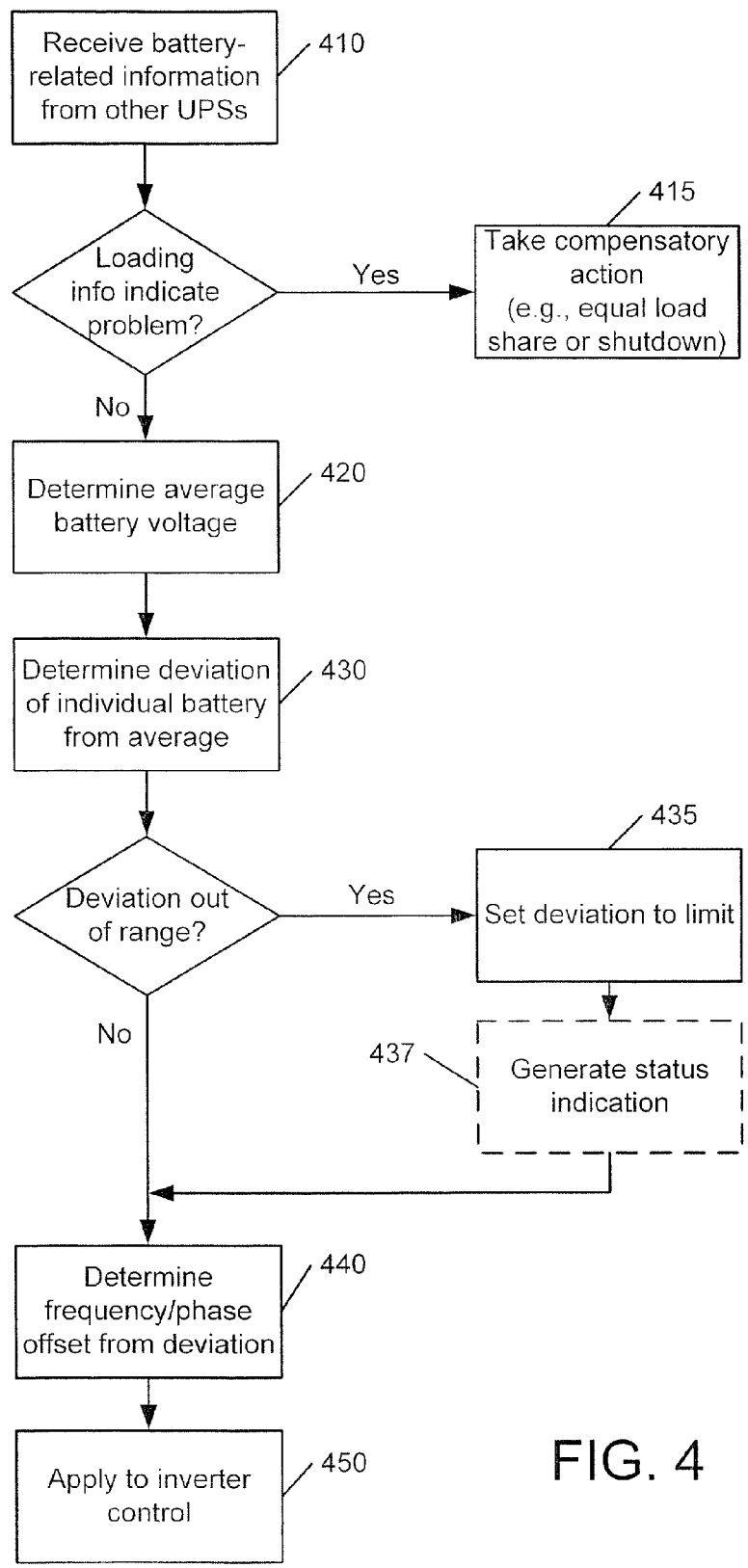
FIG. 4 is a flowchart illustrating operations for battery load control in parallel-connected UPS system according to some embodiments of the present invention.

FIG. 4 illustrates exemplary operations for battery load control in a UPS system, such as the system illustrated in FIGS. 2 and 3, according to further embodiments of the present invention. The UPS receives battery-related information from other UPSs (block 410). This information may include, for example, battery voltage (or another variable indicative of battery capacity) and loading information (e.g., kW and kVA being provided by the UPS's inverter from its associated battery). If the loading information indicates a problem, such as an overloading and/or an underloading or backfeeding of a particular UPS, the UPS may take compensatory actions (block 415). For example, if a loading problem is detected, the UPS may revert to an equal load share regime, i.e., a scheme wherein each UPS attempts to provide the same amount of power to the load, or may initiate a shutdown procedure.

If no loading problem is indicated, the UPS determines an average battery voltage from its own measurements of its associated battery and from the battery voltage information for the other UPSs (block 430). The UPS further determines a deviation of its own battery voltage with respect to the average battery voltage (block 430). It will be appreciated that this determination may be made in a variety of ways, for example, from instantaneous values and/or from values generated by filtering over a time interval. If the determined deviation of the UPS's battery voltage with respect to the average battery voltage is within a predetermined range, a phase offset is determined from the battery voltage deviation (block 440). In some embodiments, for example, the phase offset may be determined in linear proportion to the battery voltage deviation using, for example, a scaling coefficient. The determined phase offset is then applied to the inverter control to adjust power flow from the battery to the load, which may cause the UPS to take on or shed load (block 450).

If it is determined that the battery voltage deviation is outside of the predetermined range, the deviation may be fixed to a minimum or maximum value (block 435), and the phase offset determined from the fixed minimum or maximum value. A persistent deviation outside of a predetermined range may also be indicative, for example, of a low battery capacity or other problem, which may also trigger a status indication (block 437). Such an indication may include, for example, generation of an alarm signal to an operator, who may responsively perform maintenance or other compensatory operations. In this manner, a battery test under actual loading conditions may be integrated with a battery load share process.

With each parallel-connected UPS performing such operations, the power flows from the respective batteries may be adjusted such that relatively larger amounts of power may be drawn from the battery or batteries with the greatest capacity and drawdown of the batteries is substantially equalized over time. Consequently, the on-battery runtime of the parallel-connected system may be made less sensitive to the capacity of the weakest battery. Providing power-related limits as described above may also prevent overloading of batteries and/or backfeeding of an inverter of a UPS, which may cause, for example, over voltage on the DC link of the inverter.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method of operating a subject uninterruptible power supply (UPS) of a UPS system comprising a plurality of UPSs connected in parallel at a load bus and configured to provide power thereto from respective batteries of a plurality of batteries, the method comprising:
   determining a difference between a variable indicative of battery capacity for a battery associated with the subject UPS and an average value of the variable for the plurality of batteries; and
   controlling a power flow between the subject UPS and the load bus by controlling a phase of an inverter of the subject UPS responsive to the determined difference, wherein adjustment of the phase of the inverter is limited responsive to the determined difference falling outside of a predetermined range.

2. The method of claim 1:
   wherein determining a difference between a variable indicative of battery capacity for a battery associated with the subject UPS and an average value of the variable for the plurality of batteries comprises determining a difference between a battery voltage of the battery associated with the subject UPS and an average battery voltage of the plurality of batteries; and
   wherein controlling a power flow between the subject UPS and the load bus by controlling a phase of an inverter of the subject UPS responsive to the determined difference comprises controlling the power flow between the subject UPS and the load bus responsive to the determined difference between the battery voltage of the battery associated with the subject UPS and the average battery voltage of the plurality of batteries.

3. The method of claim 1, wherein controlling a phase of an inverter of the subject UPS responsive to the determined difference comprises controlling the phase linearly with respect to the determined difference.

4. The method of claim 1, further comprising determining respective power flows of the respective UPSs and limiting adjustment of the power flow between the subject UPS and the load bus responsive to the respective power flows meeting a predetermined criterion.

5. The method of claim 1, further comprising generating a status indicator for the battery associated with the subject UPS responsive to the determined difference meeting a predetermined criterion.

6. The method of claim 1, wherein determining a difference between a variable indicative of battery capacity for a battery associated with the subject UPS and an average value of the variable for the plurality of batteries comprises:
   receiving values of the variable indicative of battery capacity of other UPSs of the plurality of UPSs at the subject UPS over a communications network coupling the plurality of UPSs; and
   determining the average value of the variable from the received values.

7. A UPS comprising:
   an inverter configured to transfer power between a battery and a load bus coupled to an output of the UPS; and
   a controller operatively coupled to the inverter and configured to determine a difference between a variable indicative of battery capacity for the battery and an average value of the variable for batteries associated with a plurality of UPSs coupled in parallel at the load bus and to adjust a power flow between the inverter and the load bus by controlling a phase of the inverter responsive to the determined difference, wherein adjustment of the phase of the inverter is limited responsive to the determined difference falling outside of a predetermined range.

8. The UPS of claim 7, wherein the controller is configured to determine a difference between a battery voltage of the battery and an average battery voltage of the plurality of batteries and to adjust a power flow between the inverter and the load bus responsive to the determined difference between the battery voltage of the battery and the average battery voltage.

9. The UPS of claim 7, wherein the controller is configured to adjust the phase linearly with respect to the determined difference.

10. The UPS of claim 7, wherein the controller is further configured to determine respective power flows between the respective UPSs and the load bus and to limit adjustment of the power flow between the inverter and the load bus responsive to the respective power flows meeting a predetermined criterion.

11. The UPS of claim 7, wherein the controller is further configured to generate a status indicator for the battery responsive to the determined difference meeting a predetermined criterion.

12. The UPS claim 7, wherein the controller is configured to receive values of the variable indicative of battery capacity of other UPSs of the plurality of UPSs at the subject UPS over a communications network coupling the plurality of UPSs and to determine the average value of the variable from the received values.

13. A computer program product for operating a subject UPS of a system comprising a plurality of UPSs connected in parallel at a load bus and configured to provide power thereto from respective batteries of a plurality of batteries, the computer program product comprising computer program code embodied in a computer-readable storage medium, the computer program code comprising:

program code configured to determine a difference between a variable indicative of battery capacity for a battery associated with the subject UPS and an average value of the variable for the plurality of batteries and to adjust a power flow between the subject UPS and the load bus by controlling a phase of an inverter of the subject UPS responsive to the determined difference, wherein adjustment of the phase of the inverter is limited responsive to the determined difference falling outside of a predetermined range.

14. The computer program product of claim 13, wherein the program code configured to determine a difference between a variable indicative of battery capacity for a battery of the subject UPS and an average value of the variable for the plurality of batteries and to adjust a power flow between the subject UPS and the load bus by controlling a phase of an inverter of the subject UPS responsive to the determined difference, wherein adjustment of the phase of the inverter is limited responsive to the determined difference falling outside of a predetermined range comprises program code configured to determine a difference between a battery voltage of the battery associated with the subject UPS and an average battery voltage of the plurality of batteries and to adjust a power flow between the subject UPS and the load bus responsive to the determined difference between the battery voltage of the battery associated with the subject UPS and the average battery voltage.

15. The computer program product of claim 13, wherein the computer program code further comprises program code configured to generate a status indicator for the battery of the subject UPS responsive to the determined difference meeting a predetermined criterion.

* * * * *